US009435679B2

(12) United States Patent
Daily, III (10) Patent No.: US 9,435,679 B2
(45) Date of Patent: Sep. 6, 2016

(54) TETHERED FLOAT LIQUID LEVEL SENSOR

(75) Inventor: William Dean Daily, III, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1022 days.

(21) Appl. No.: 12/882,913

(22) Filed: Sep. 15, 2010

(65) Prior Publication Data

US 2012/0060601 A1   Mar. 15, 2012

(51) Int. Cl.
*G01F 23/40* (2006.01)
*G01F 23/42* (2006.01)
*G01F 23/44* (2006.01)

(52) U.S. Cl.
CPC ............... *G01F 23/40* (2013.01); *G01F 23/42* (2013.01); *G01F 23/44* (2013.01); *G01F 23/443* (2013.01); *G01F 23/446* (2013.01)

(58) Field of Classification Search
USPC .................................................... 73/313, 321
See application file for complete search history.

(56) References Cited

U.S. PATENT DOCUMENTS

| 3,409,750 | A | | 11/1968 | Hathaway |
| 4,685,332 | A | | 8/1987 | Betterton et al. |
| 4,818,976 | A | | 4/1989 | Schmitt et al. |
| 5,253,521 | A | | 10/1993 | Abramovich et al. |
| 5,671,793 | A | * | 9/1997 | Lee ........................ 160/168.1 R |
| 5,821,864 | A | | 10/1998 | Knop et al. |
| 7,161,165 | B2 | | 1/2007 | Wirthlin |
| 7,209,865 | B2 | * | 4/2007 | Scott et al. .................... 702/188 |
| 7,216,537 | B2 | * | 5/2007 | Margolin et al. ............... 73/314 |
| 2005/0235749 | A1 | * | 10/2005 | Morris ............................ 73/313 |
| 2008/0060430 | A1 | | 3/2008 | Galloway et al. |
| 2009/0301188 | A1 | | 12/2009 | Calcote |

* cited by examiner

*Primary Examiner* — Paul West
(74) *Attorney, Agent, or Firm* — Eddie E. Scott (57) ABSTRACT

An apparatus for sensing the level of a liquid includes a float, a tether attached to the float, a pulley attached to the tether, a rotation sensor connected to the pulley that senses vertical movement of said float and senses the level of the liquid.

2 Claims, 6 Drawing Sheets

TETHERED FLOAT LIQUID LEVEL SENSOR

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

1. Field of Endeavor

The present invention relates to a liquid level sensor and more particularly to a tethered liquid level sensor.

2. State of Technology

U.S. Pat. No. 3,409,750 for a liquid level float switch provides the following state of technology information: "A liquid level switch which includes a sleeve made of electrically conducting material which is mounted in a container having a supply of liquid. The bottom of the sleeve is enclosed with an insulating ring which surrounds and separates a metal contact area from the wall of the sleeve in order to form a switch gap in the enclosed bottom area. The metal contact area is a bolt which connects the sleeve, the insulating ring and a drain plug positioned in the bottom of the container together so as to form a unitary device. A ball float is positioned inside the sleeve having at least its surface area covered with a conductive material. The ball normally floats above the bolt and therefore does not bridge the gap between the bolt and the wall of the sleeve. When the liquid level reaches a predetermined low level, the ball float bridges the gap between the bolt and the sleeve to close the switch gap. A further improvement includes a device for detecting an improper placement of the drain plug by energization of an alarm circuit."

U.S. Pat. No. 4,685,332 for a liquid level sensing device provides the following state of technology information: "A liquid level sensing device utilizing a conductive hollow sphere buoyed by the liquid and guided vertically within a metal tube. An elongated resistance card is mounted in the tube adjacent the sphere to permit the sphere to slide along its surface as the liquid level changes thereby electrically connecting a portion of the resistance card to the metal housing through the conductive sphere. The resistance card is mounted so as to be flexed from its normal flat configuration with the flexed configuration producing a light force on the sphere to maintain good electrical contact therewith and between the sphere and the housing but insufficient to deter the sphere from following liquid level changes."

U.S. Pat. No. 4,818,976 for a device for monitoring hydrocarbons in groundwater provides the following state of technology information: "An apparatus for sensing the leakage of hydrocarbons from underground storage tanks having a hydrocarbon vapor sensor, a liquid sensor to determine the level of the groundwater and the positioning of the vapor sensor; and, alarm and trouble circuitry to indicate the presence of a hydrocarbon leak or a malfunctioning circuit. The apparatus also contains a timer mechanism to accurately determine whether or not the hydrocarbon has actually leaked from an underground storage tank or is present in the test area due to natural gases or above-ground spills."

U.S. Pat. No. 5,253,521 for a method of transmitting measured temperature and position parameters from a transducer provides the following state of technology information: "A magnetostrictive liquid level transducer equipped with a number of temperature sensitive resistors is supplied with low level power from a remote station and charges a capacitor to store power for interrogation of the level transducer. The transducer is interrogated periodically for level measurements and the capacitor is recharged between interrogations. During the recharging periods, temperature measurements are made. Thus the level and temperature related data is measured and transmitted alternately. Each measurement results in a pair of pulses having a spacing corresponding to the measured value. The transmission message comprises a plurality of frames or time periods. The first frame is blank and is used for synchronizing the receiving device with the message frames. The subsequent frames have the level and temperature related data interleaved in the message and are easily sorted by the receiving device at the remote station. The data pulses are sent on the power transmission conductors."

U.S. Pat. No. 5,821,864 for an interface probe apparatus and method provides the following state of technology information: "A wireless interface probe having a transmitter, a signal transport/measuring device, and a receiver as provided. The transmitter has two sensors: a liquid level sensor and a water level sensor. The liquid level sensor determines the boundary between gaseous and liquid media. The water level sensor detects the presence of conductive liquid such as water. Signals generated by the transmitter sensors are transported inductively to the receiver via the signal transport/measuring device. The signal transport/measuring device is a standard metallic measuring tape which affixes to the transmitter via metallic fasteners. The receiver decodes the signals generated by the transmitter and creates an audio and visual reading output. The output reading indicates to the operator the level of the free-phase hydrocarbons and the level of the water. The difference between the two levels is the thickness of the hydrocarbons, which can be determined by using the measuring tape."

U.S. Pat. No. 7,161,165 for an optical transducer for continuously determining liquid level provides the following state of technology information: "An optical transducer for determining liquid level within a container includes a sensing probe having a first elongate measurement face and a second elongate measurement face that converges toward the first measurement face. A light source is positioned for directing radiant energy into the sensing probe and a photosensor is positioned for detecting an amount of radiant energy exiting the sensing probe. With this arrangement, a change in the amount of radiant energy as detected by the photosensor is indicative of a change in liquid level within the container."

United States Published Patent Application No. 2008/0060430 for a liquid level measuring device and installation incorporating the same provides the following state of technology information: "A liquid level measurement device comprises a generally seamless pipe for insertion into an installation in which liquid level is to be monitored and a non-contact sensor assembly disposed within the pipe at a location spaced above the liquid. The sensor assembly senses the level of the liquid and generates output representative of the liquid level."

United States Published Patent Application No. 2009/0301190 for a capacitive sensor assembly for determining relative position provides the following state of technology information: "A capacitive sensor assembly for detecting relative movement or position between objects, such as liquid level in a tank or reservoir, movement of one machine component with respect to another, and so on, includes one or more antenna probes connected to an integrated chip normally associated with touch-screen displays. Each antenna probe operates independently and may be formed as insulated conductive wires or conductive traces between layers of a stiff or flexible substrate, such as a PCB, with the substrate material serving as the insulating layers. Each antenna probe has a different length representing different measurement positions or locations between the objects being measured to provide dynamic calibration of the measurement under changing environmental conditions."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a system for measuring liquid level. This system utilizes a mechanical float mechanism and position sensor to detect the direction and magnitude of movement of the float. The float is attached to a pulley via a tether. When the liquid level rises, the float rises and the tether turns the pulley one way. When the liquid level falls, the float also drops and turns the pulley the other way. The magnitude and direction of pulley rotation is monitored by a commercially available sensor. The sensor generates electronic signals that are used to calculate the updated level of the float and thus the liquid level. The tension on the tether, that connects the float to the pulley, is maintained by a weighted block below the float. The tension is required to eliminate slipping between the tether and the pulley.

In one embodiment of the present invention, an apparatus is provided for sensing the level of a liquid. The apparatus includes a float, a tether attached to the float, a pulley attached to the tether, a rotation sensor connected to the pulley that senses vertical movement of said float and senses the level of the liquid.

The present invention has use in water wells. The present invention also has use in wherever there is vertical access to a container filled with liquid. The signals that are generated by the sensor can be used to calculate the position of the float, and thus the liquid level with reference to the initial, or calibrated, position. This information can be used for monitoring, alarms, and equipment activation.

The present invention' system was invented to achieve a number of benefits. Some specific benefits are listed below:

Benefit—There is no down-hole metallic equipment that could cause galvanic corrosion.

Benefit—There are no submerged or down-hole electronics.

Benefit—The mechanical system is easily calibrated and maintained by facility operator Benefit—The equipment is less expensive than current systems.

Benefit—This system is designed to have greater accuracy (±0.016 inches or about 1/64 inches)

Benefit—The system is designed to utilize existing ½" sanitary seal ports using ½" pvc sounding tube.

Benefit—The rotary sensor can be battery operated on 5 VDC.

Benefit—It is anticipated that due to the few moving parts and above ground electronics that a significantly longer design life may be realized.

Benefit—With only a change in the length of the tether, this system will fit any size or depth of well.

Benefit—The digital pulse output is more accurate, less susceptible to interference and noise than 4-10 mA analog signals.

Benefit—Due to the low voltage requirement of the rotary sensor, there may not be a need for electrician support to do maintenance on the system.

Benefit—There should be no deleterious effect from pump vibration as with standard pressure transducers.

Benefit—There's no need to vent this system to the atmosphere and it's not affected by change in atmospheric pressure.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF SPECIFIC EMBODIMENTS

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

The prior art industry standard for remote, continuous, measurement of water level in wells utilizes pressure transducers. These transducers are submerged within the well water and transmit a signal that is converted to pressure. The pressure is then converted to water elevation above the transducer, after taking into account atmospheric pressure. It has been observed that these pressure transducers have been problematic in that they are expensive and tend to have a high failure rate. The expense of these transducers and the associated time required to replace them has led to the search of more viable options.

Other prior art options that have been considered include resistance tape, bubblers, and sonic or laser reflection sensors. These prior art options have proven to be as cumbersome, expensive and problematic as the pressure transducers, especially in narrow tank applications with wide variations in level. The system of the present invention utilizes a flotation device that is accurately and reliably monitored within the full spectrum of groundwater rise and fall.

The present invention provides a system for measuring well water elevation be considered for testing/demonstration. The driver is the desire to reduce cost and downtime from failure of existing equipment. This method utilizes a mechanical float mechanism and position sensor to detect the direction and magnitude of movement of the float. The final system would fit existing wellhead configurations and data collection capabilities.

The present invention' system for down-hole liquid level sensing is based on the buoyancy of a tethered float. The float rises and falls with the water level within the well and always stays at the same submergence regardless of the water depth.' The tether is a cable that connects the float to a pulley located above the well head. The position sensor detects the magnitude and direction of the pulley rotation as the float rises and falls. The sensor then transmits this data in digital format as two streaming data strings. This data is the change in groundwater level up or down and is used to calculate. the real time water level based on the calibrated value. Having the cable in a continuous loop ensures that there is no effect on the buoyancy of the flow due to the weight of the cable. A weight at the bottom loop of the cable keeps tension on the cable so that it doesn't slip on the pulley. To facilitate unobstructed movement, the float and cable reside within a PVC perforated pipe.

Preferred Embodiment & Specific Examples

Figure 1:
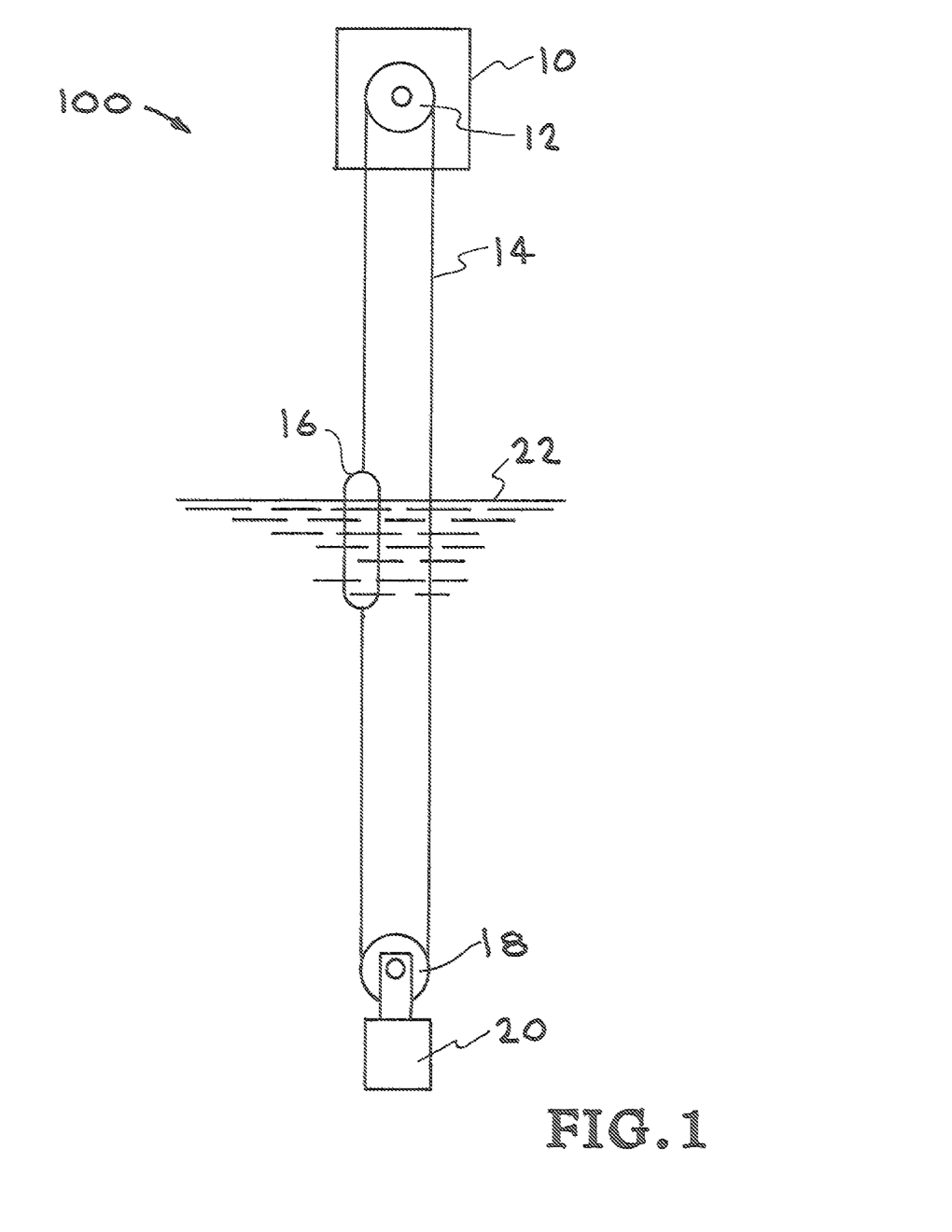
FIG. 1 is a conceptual drawing showing some of the items of the tethered float liquid level sensor system of one embodiment of the present invention.

Referring now to the drawing and in particular to FIG. 1 a conceptual drawing showing some of the items of the tethered float liquid level sensor system of one embodiment of the present invention. FIG. 1 includes the items of the tethered float liquid level sensor system listed below.

100 Tethered float liquid level sensor
10 Rotary motion sensor
12 Upper pulley
14 Cable
16 Tethered float
18 Lower pulley
20 Cable tensioner
22 Water level FIG. 1 is a conceptual drawing showing some of the items of the tethered float liquid level sensor system 100. Shown here is a rotary motion sensor 10. A pulley 12 is mounted to the rotary motion sensor 10. A cable 14 goes around the pulley and the same cable 14 also goes around a lower pulley 18, this lower pulley 18 is attached to the cable tensioner 20. Two ends of the cable 14 are secured to the upper and lower ends of the float 16. As the water level 22 rises or falls the float 16 which is tethered to the cable will also rise or fall and the cable 14 will cause a rotary motion to pulley 12 which in turn causes rotary motion sensor 10 to rotate. The rotary motion sensor 10 is calibrated to convert the rotary motion from the float/cable motion into a water level 22 in whatever units are specified, such as inches or fraction of inches.

Figure 2A:
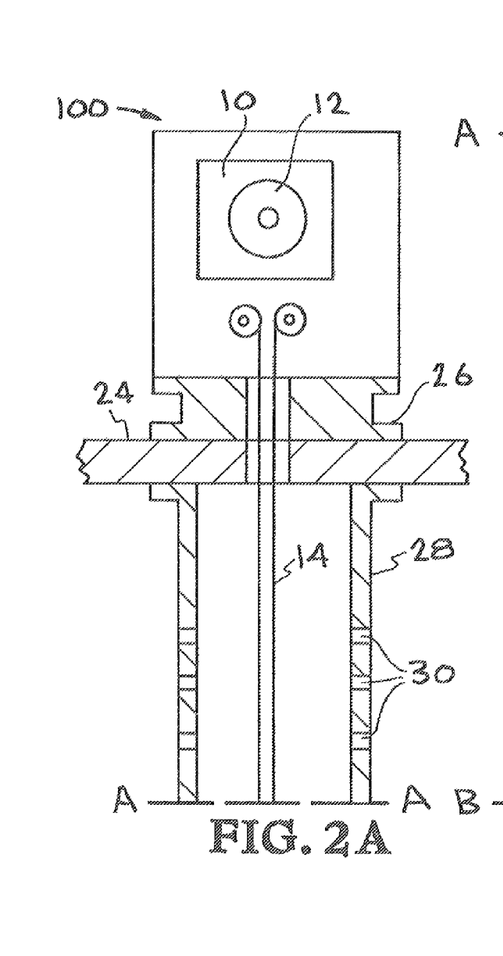
FIGS. 2A, 2B & 2C illustrate the tethered float liquid level sensor system of FIG. 1 in greater detail.
Figure 2B:
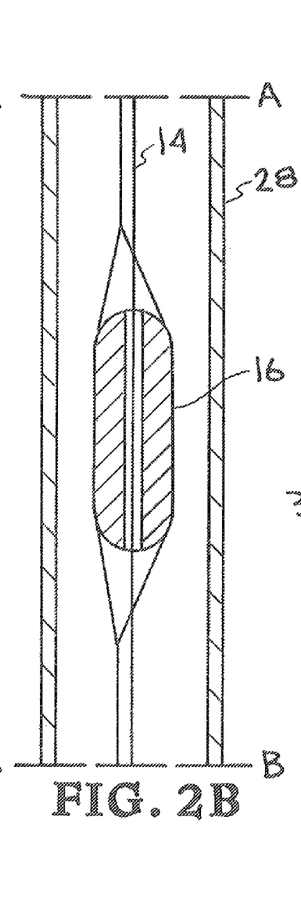
Figure 2C:
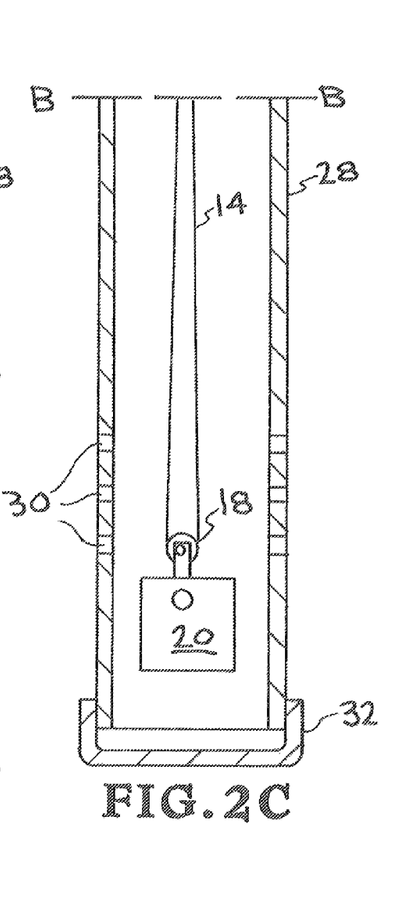

Referring now to FIGS. 2A, 2B, and 2C, additional items of the tethered float liquid level sensor system of one embodiment of the present invention. FIG. 2 includes the items of the tethered float liquid level sensor system listed below.

24 Well top plate
26 Sensor mounting flange
28 Housing
30 Holes
32 End cap

FIGS. 2A 2B & 2C illustrate the tethered float liquid level sensor system 100 in greater detail. If you were to connect FIG. 2A to FIG. 2B at the line A-A, and connect FIG. 2B to FIG. 2C at the line B-B, you would have a complete but very short system. FIG. 2A illustrated the upper portion of the system 100. The rotary motion sensor 10 with attached upper pulley 12 is shown on mounting flange 26 which attaches the system 100 to the top plate 24 of a container or well that has fluid level that is too measured. The tethered float and cable will be enclosed in a housing 28. The housing 28 will have a series of holes 30 at specified intervals to equalize the fluid level in the system 100 and whatever vessel the fluid level is too be measured. FIG. 2B shows a mid section of the system 100. Here is shown the float 16 tethered to the cable 14 with one strand of the cable 14 sown passing through an opening in the float 18 and other ends of the cable 14 fastened to the ends of the float 16. FIG. 2C shows the lower portion of the system 100. The housing 28 with equalizing holes 30 and the cable 14 going around the lower pulley 18 with the pulley 18 shown attached to the cable tensioner 20. The housing 28 terminated at the end cap 32.

Figure 3:
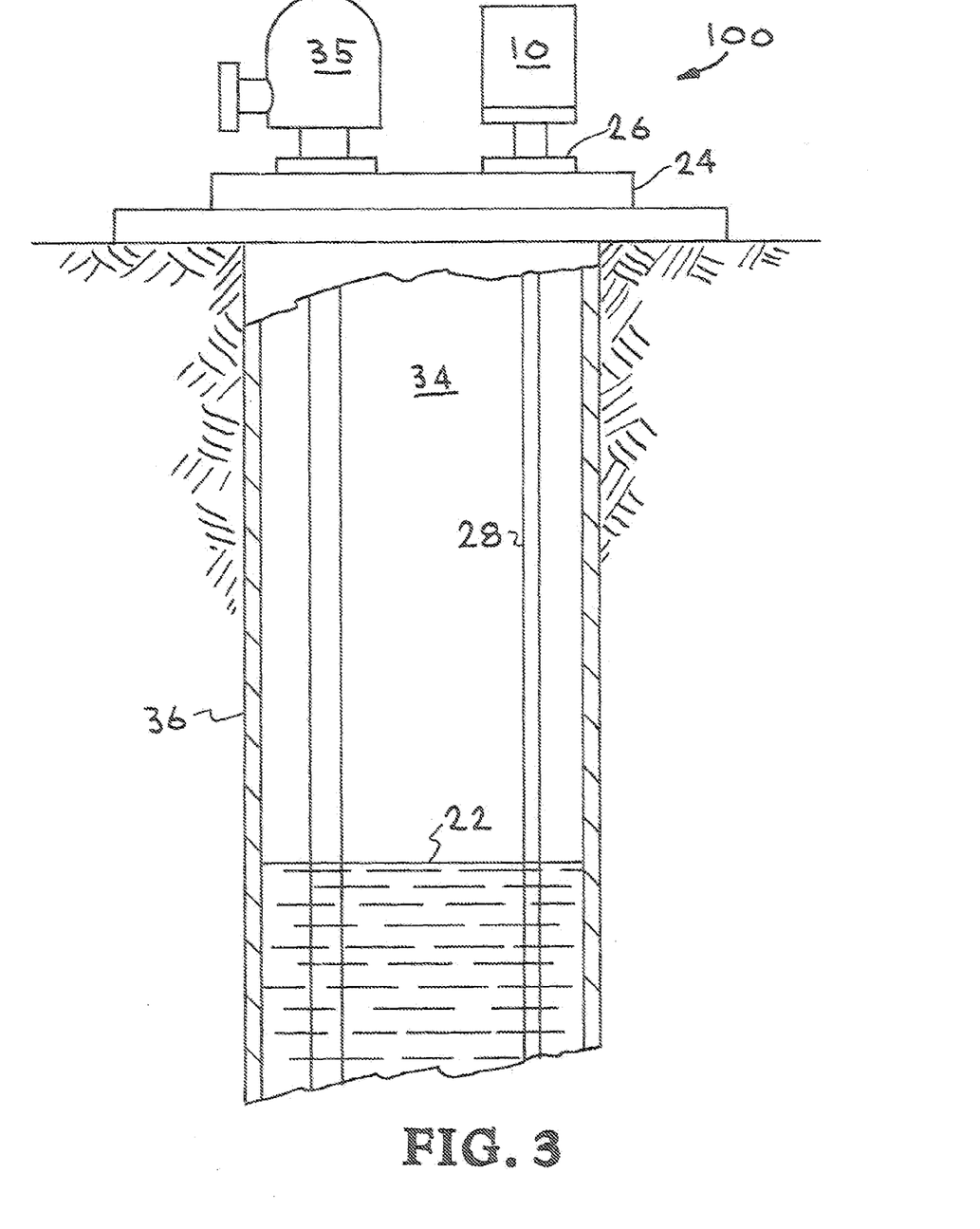
FIG. 3 is an illustration showing the tethered float liquid level sensor system installed on a well.

FIG. 3 shows the tethered float liquid level sensor system installed on a well. Some of the items of the tethered float liquid level sensor system listed below.

34 Well
35 Pump
36 Well casing

FIG. 3 shows the tethered float liquid level sensor system installed on a well 34. The well has a pump 35 and a well casing 36. The rotary motion sensor is shown on it mounting flange 24 which is secured to the well top plate 24. The housing 28 of system 100 is shown immersed in the fluid of which the level 22 is to measured.

Figure 4:
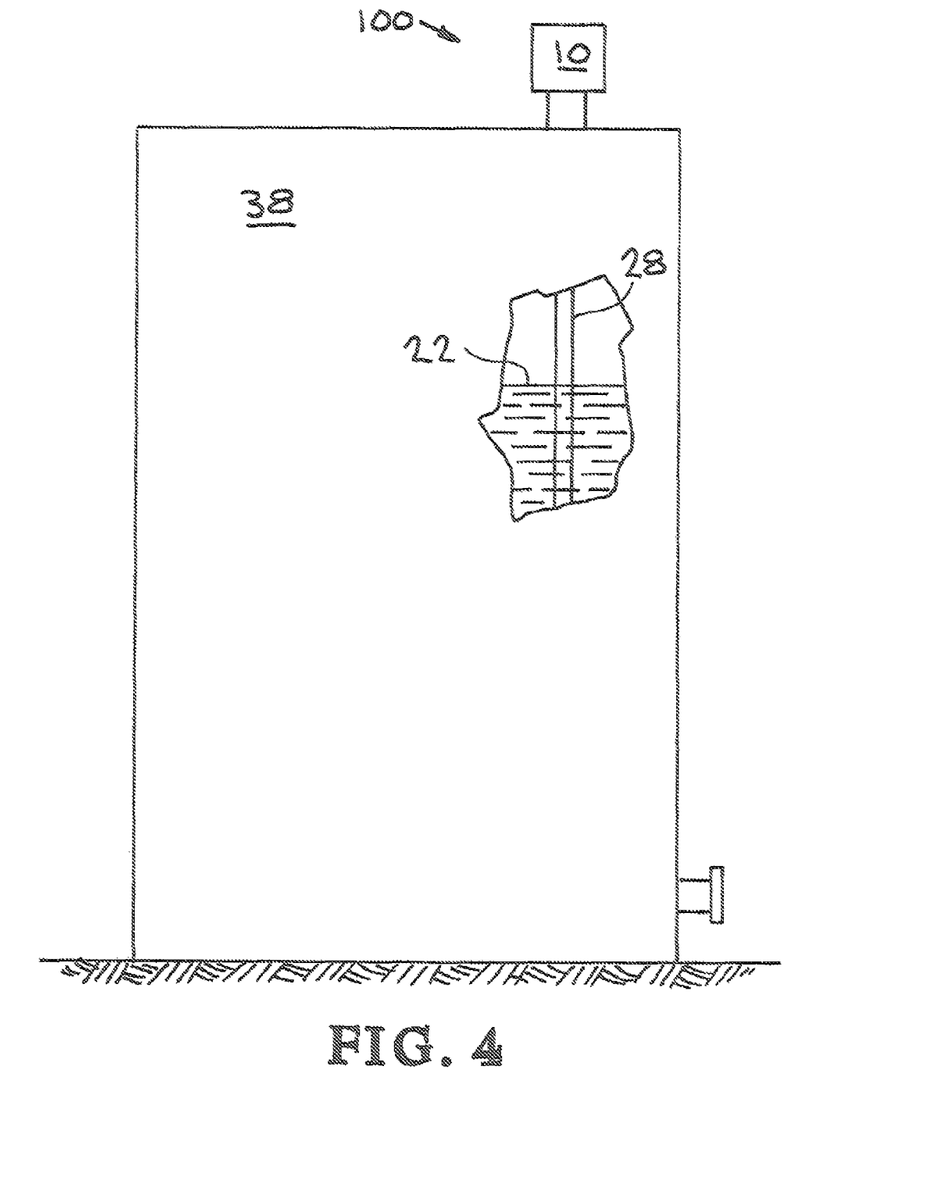
FIG. 4 illustrated another possible use for the tethered float liquid level sensor system.

FIG. 4 shows the tethered float liquid level sensor system. FIG. 4 illustrates another possible use for the tethered float liquid level sensor system 100. Here is shown a tank or vessel 38 with a cut out area to show the housing 28 and fluid level 22.

Figure 5:
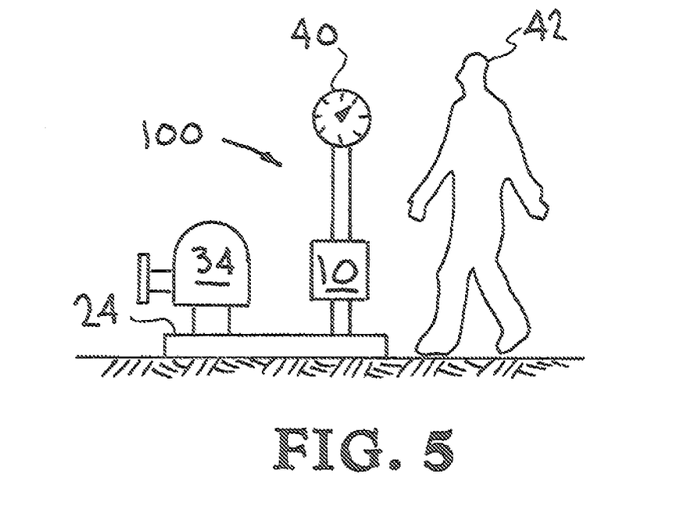
FIGS. 5A and FIG. 5B illustrated other possible uses for the tethered float liquid level sensor system.
Figure 5B:
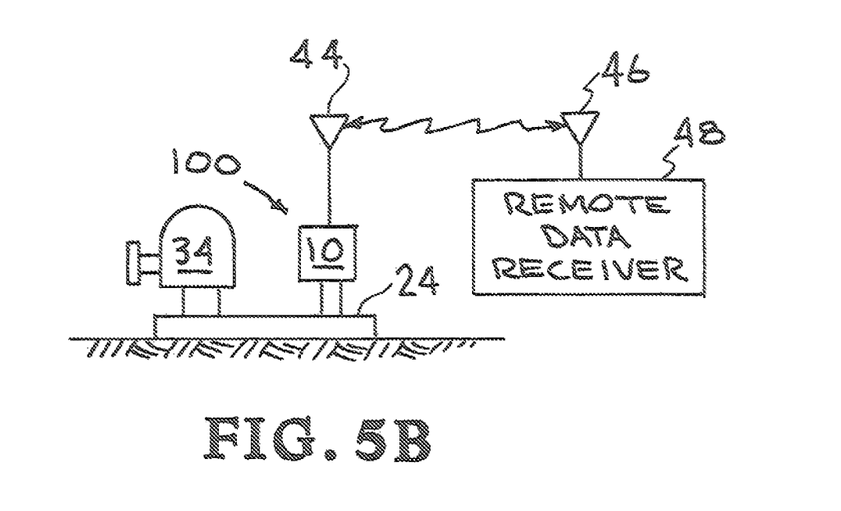

FIGS. 5A and FIG. 5B illustrated other possible uses for the tethered float liquid level sensor system. Some of the items of the tethered float liquid level sensor system listed below.

40 Data read out
42 Individual
44 Transmitter/antenna
46 Antenna
48 Remote data receiver In FIG. 5A we see an individual at the site where the system 100 is In use. The data from the rotary motion sensor can easily be converted to whatever units are desired and can then be displayed at some sort of data read out for easy access by an individual.

In FIG. 5B we illustrate a method of remotely accessing the data acquired by the system 100. A transmitter/receiver 44 can send or receive information from a remote data receiver/transmitter.

Figure 6:
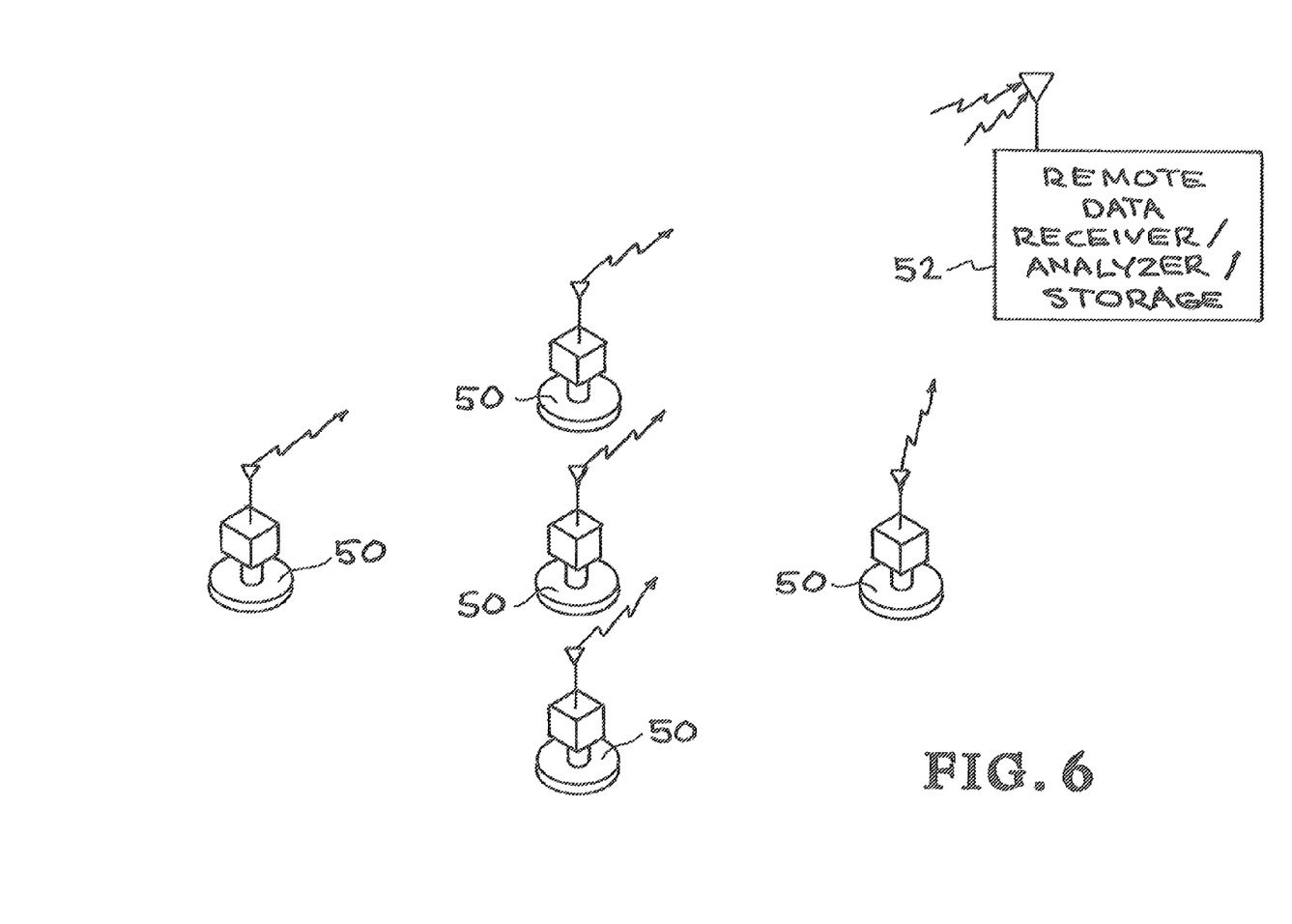
FIG. 6 illustrates remote sites with the transmitter/receiver units that can be queried by the remote data transmitter/receiver/analyzer/storage unit.

FIG. 6 illustrates remote sites with the transmitter/receiver units that can be queered by the remote data transmitter/receiver/analyzer/storage unit. Some of the items of the tethered float liquid level sensor system listed below.

50 Remote well locations
52 Remote data receiver analyzer/storage

FIG. 6 shows several remotes site with the system 100 and transmitter/receiver units that can be queried by the remote data transmitter/receiver/analyzer/storage unit 52. The remote system shown here could be completely automated whereby a computer could send a signal to a remote site requesting the remote site to transmit data back to the computer for processing.

Materials and Equipment

Float: The float is polypropylene, which has a SG of 0.96. This gives it enough buoyancy to stay afloat, and enough weight to activate the pulley.

Rotary Motion Sensor: The rotary motion sensor is a commercially available product manufactured in California. It's used to facilitate the measure of angular rotation converted from linear displacement. The output of the sensor is a digital signal that gives rotation magnitude and direction. Please refer to the manufacturer's specification sheets.

Cable: The cable or tether is a Fluorocarbon cable that is rated to 50 pounds and designed to minimize stretching. Specification sheet attached.

Mechanical support equipment: The structural members of the system are fabricated from PVC and Teflon to avoid issues with corrosion and contamination.

Benefits

The present invention' system was invented to reduce the costs and time associated with the frequent failures of existing equipment. Some of specific benefits are listed below:

Benefit—There is no down-hole metallic equipment that could cause galvanic corrosion.

Benefit—There are no submerged or down-hole electronics.

Benefit—The mechanical system is easily calibrated and maintained by facility operator Benefit—The equipment is less expensive than current systems.

Benefit—This system is designed to have greater accuracy (±0.016 inches or about 1/64 inches)

Benefit—The system is designed to utilize existing sanitary seal ports using ½" pvc sounding tube.

Benefit—The rotary sensor can be battery operated on 5 VDC.

Benefit—It is anticipated that due to the few moving parts and above ground electronics that a significantly longer design life may be realized.

Benefit—With only a change in the length of the tether, this system will fit any size or depth of well.

Benefit—The digital pulse output is more accurate, less susceptible to interference and noise than 4-10 mA analog signals.

Benefit—Due to the low voltage requirement of the rotary sensor, there may not be a need for electrician support to do maintenance on the system.

Benefit—There should be no deleterious effect from pump vibration as with standard pressure transducers.

Benefit—There's no need to vent this system to the atmosphere and it's not affected by change in atmospheric pressure.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A liquid level sensor apparatus for sensing the level of a liquid in a well, consisting of:
   a housing extending into the well and into the liquid in the well,
   holes in said housing that allow the liquid to enter said housing,
   a float in said housing,
   a tether element in said housing attached to said float in said housing,
   an upper pulley attached to said tether element in said housing,
   a lower pulley in said housing attached to said tether element in said housing and attached to said float in said housing,
   a tether element tensioner in said housing attached to said lower pulley in said housing, and
   a rotation motion sensor connected to said upper pulley that senses vertical movement of said float in said housing thereby sensing the level of the liquid in said well,
   said rotation motion sensor generating an electronic signal that is used to calculate the level of the float and thus the liquid level in said well, and
   a transmitter receiver unit that receives said electronic signal that is used to calculate the level of the float and thus the liquid level in the well.

2. A system for sensing the levels of liquids in a multiplicity of wells by sensing the level of liquid in each individual well that makes up the multiplicity of wells, consisting of:
   a liquid level sensor with a transmitter and receiver at each individual well, each said liquid level sensor with a transmitter and receiver consisting of
   an elongated housing extending into each individual well and into the liquid in each individual well,
   holes in said elongated housing extending into each individual well and into the liquid in each individual well wherein said holes allow the liquid to enter said elongated housing,
   a float in said elongated housing extending into each individual well and into the liquid in each individual well,
   a tether elements element attached to said float in said elongated housing extending into each individual well and into the liquid in each individual well,
   an upper pulley attached to said tether element in said elongated housing extending into each individual well and into the liquid in each individual well,
   a lower pulley in said housing attached to said tether element in said elongated housing and attached to said float in said housing,
   a tether element tensioner connected to said lower pulley in said elongated housing, and a rotation motion sensor connected to said upper pulley that senses vertical movement of said float and thereby senses the level of the liquid in each individual well, a transmitter receiver unit that receives said electronic signal that is used to calculate the level of the float and thus the liquid level in each individual well and transmit a signal, and a remote transmitter and receiver and analyzer unit that receives said signal from said transmitter receiver unit for sensing the level of liquids in each individual well that makes up the multiplicity of wells.

\* \* \* \* \*